US011078117B2

(12) United States Patent
Nissinen et al.

(10) Patent No.: US 11,078,117 B2
(45) Date of Patent: Aug. 3, 2021

(54) THERMALLY-CONDUCTIVE, LOW STRENGTH BACKFILL MATERIAL

(71) Applicant: Nano and Advanced Materials Institute Limited, Hong Kong (HK)

(72) Inventors: Tomi Pekka Bernhard Nissinen, Hong Kong (HK); Xianrui Chen, Hong Kong (HK); Jiawen Qiu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 37 days.

(21) Appl. No.: 16/799,866

(22) Filed: Feb. 25, 2020

(65) Prior Publication Data

US 2020/0377415 A1 Dec. 3, 2020

Related U.S. Application Data

(60) Provisional application No. 62/853,732, filed on May 29, 2019.

(51) Int. Cl.

| | |
|---|---|
| ***C04B 28/04*** | (2006.01) |
| ***C09K 5/14*** | (2006.01) |
| ***C04B 14/28*** | (2006.01) |
| ***C04B 14/04*** | (2006.01) |
| ***C04B 14/02*** | (2006.01) |
| ***C04B 103/30*** | (2006.01) |
| ***C04B 103/40*** | (2006.01) |
| ***C04B 103/10*** | (2006.01) |
| ***C04B 103/42*** | (2006.01) |

(52) U.S. Cl.

CPC ............ *C04B 28/04* (2013.01); *C04B 14/024* (2013.01); *C04B 14/04* (2013.01); *C04B 14/28* (2013.01); *C09K 5/14* (2013.01); *C04B 2103/10* (2013.01); *C04B 2103/304* (2013.01); *C04B 2103/40* (2013.01); *C04B 2103/42* (2013.01); *C04B 2201/32* (2013.01); *C04B 2201/50* (2013.01)

(58) Field of Classification Search

CPC ..... C04B 12/04; C04B 14/022; C04B 14/024; C04B 14/026; C04B 14/04; C04B 14/06; C04B 14/20; C04B 14/22; C04B 14/28; C04B 14/303; C04B 14/304; C04B 14/365; C04B 18/04; C04B 18/08; C04B 18/16; C04B 18/22; C04B 18/106; C04B 18/142; C04B 22/085; C04B 22/10; C04B 22/124; C04B 22/147; C04B 24/04; C04B 24/121; C04B 28/04; C04B 28/06; C04B 28/08; C04B 28/065; C04B 38/10; C04B 2103/10; C04B 2103/0079; C04B 2103/32; C04B 2103/304; C04B 2103/40; C04B 2103/42; C04B 2111/00465; C04B 2111/00706; C04B 2111/00051; C04B 2201/32; C04B 2201/50; C09K 5/14; Y02W 30/91

See application file for complete search history.

(56) References Cited

FOREIGN PATENT DOCUMENTS

| | | |
|---|---|---|
| CN | 101607260 A | 12/2009 |
| CN | 103030347 A | 4/2013 |
| CN | 103992068 A | 8/2014 |

OTHER PUBLICATIONS

Hong Kong Search Report of corresponding Hong Kong Short Term Patent Application No. 32020005556.6 dated May 22, 2020.

*Primary Examiner* — Anthony J Green

(74) *Attorney, Agent, or Firm* — Idea Intellectual Limited; Margaret A. Burke; Sam T. Yip

(57) ABSTRACT

A low strength backfill material having a 28 days compressive strength less than approximately 2.0 MPa is provided. The backfill is suitable for use in areas with dense underground utilities due to its high excavatability and good thermal conductivity. The backfill includes a cementitious binder of approximately 1 weight percent to approximately 10 weight percent and fine aggregates in an amount of approximately 40 to approximately 75 weight percent. Filler is provided at 20 microns to approximately 100 microns for high flowability. A density-controlling agent of 0.0001-5 weight percent is used such that the density of a cured backfill material is approximately 1600 $kg/m^3$ to 2000 $kg/m^3$. Thermally conductive particles having a size range of approximately 0.01 microns to 500 microns in an amount of approximately 0.1 to 10 weight percent are evenly dispersed throughout the backfill.

21 Claims, 3 Drawing Sheets

THERMALLY-CONDUCTIVE, LOW STRENGTH BACKFILL MATERIAL

CROSS-REFERENCE TO RELATED APPLICATIONS

This application claims priority from the U.S. provisional patent application Ser. No. 62/853,732 filed May 29, 2019, and the disclosure of which is incorporated herein by reference in its entirety.

FIELD OF THE INVENTION

The present invention relates to a low strength backfill material, and, more particularly, to a backfill material that is easily excavated and has good thermal conductivity, suitable for use in densely-populated urban areas with a high concentration of underground utilities.

BACKGROUND

Flowable fill is a cementitious material used primarily as backfill as an alternative to compacted soil. It can be placed with minimal effort and no soil vibration or tamping is required. Flowable cementitious slurry typically includes water, cement, fine aggregates, and various chemical additives. Flowable fill is defined by the American Concrete Institute (ACI) as a "self-compacting cementitious material that is in a flowable state at the time of placement and that has a specified compressive strength of 8.3 MPa or less at 28 days". Flowable fill contains a low cementitious content for reduced strength development, which enables future excavation. Flowable fill is capable of filling all voids in irregular excavations and hard-to-reach places (such as under and around pipes), and hardens in a matter of a few hours without the need for compaction in layers.

There are a variety of flowable fill types available for various engineering purposes. Flowable fill may be divided into two main classes: (i) excavatable fill; and (ii) nonexcavatable fill. The excavatability is dependent on a number of factors including binder strength, binder density, aggregate quantity, aggregate gradation, and the excavating equipment to be used. Most current flowable fill applications require a 28 days compressive strength of 2.0 MPa or less to allow for future excavation.

The major limitations of the existing backfill systems are the uncompleted compaction of the soil-based backfilling and high strength and poor thermal conductivity of available flowable fills. The poor workability of the currently applied soil-based systems leads to damaged carriageways due to voids within the backfill. Currently-available flowable fill mixtures cannot be readily applied due to their high strength, which limits the re-excavation of the trenches. In densely-populated urban areas, underground utilities such as electrical and optical cables are prevalent. Often, hand-excavation is required to prevent damage to sensitive pipes and cables. Due to the heat-generating nature of underground electrical cables, utility companies need improved thermal conductivity of the backfill material. Without dissipating heat properly, cables may be overheated and damaged. Current backfill materials exhibit poor thermal conductivity. For example, foam concrete only has thermal conductivity properties between 0.10 W/mK to 0.66 W/mK with a density from 300 kg/m$^3$ to 1600 kg/m$^3$ which does not meet the requirement of utilities installation.

Although foamed concrete materials have been examined for potential use as backfill materials, the hardening time of foam concrete using ordinary Portland cement is much longer than normal concrete in part due to the high air content in the matrix. In general, the hardening time increases as the density decreases. Consequently, foamed concrete cannot meet the requirements of a backfill material to decrease construction time/the time the trenches are required to remain open prior to completing with roadway or sidewalk material. Further, due to the high volume of air, the thermal conductivity of foamed concrete is poor.

Therefore, in order to meet the requirement of low strength, rapid hardening time and good thermal conductivity, there is a need in the art for a new type of backfill material.

SUMMARY OF THE INVENTION

Accordingly, a first aspect of the present invention provides a low strength backfill material having a 28 days compressive strength less than approximately 2.0 MPa. The backfill includes a cementitious binder in an amount from approximately 1 weight percent to approximately 10 weight percent; and fine aggregates having a particle less than approximately 4.75 mm in an amount of approximately 40 to approximately 75 weight percent. To increase flowability, filler, having a particle size of approximately 20 microns to approximately 100 microns may be included. Such filler may also increase the cohesiveness of the backfill. A density-controlling agent is provided in an amount of approximately 0.0001-5 weight percent, such that the density of a cured controlled low strength backfill material is 1800 kg/m$^3$ or less. Thermally-conductive particles are evenly-dispersed throughout the backfill. The thermally conductive particles have a size range of approximately 0.01 microns to 500 microns in an amount of approximately 0.1 to 10 weight percent.

In a first embodiment of the first aspect of the present invention, there is provided a backfill where the cementitious binder is one or more of ordinary Portland cement (OPC), calcium sulfoaluminate cement (CSA), alumina cement (AC), or alkali activated material.

In a second embodiment of the first aspect of the present invention, there is provided a backfill wherein the fine aggregates are selected from one or more of natural sand, manufactured sand, quartz sand, gravel, recycled glass, or recycled concrete aggregate.

In a third embodiment of the first aspect of the present invention, there is provided a backfill wherein the filler is selected from one or more of limestone, lime, fly ash, bottom ash, ground-granulated blast-furnace slag, mica, sewage sludge, or gypsum.

In a forth embodiment of the first aspect of the present invention, there is provided a backfill wherein the density controlling agent is selected from one or more of a foaming agent, air entraining agent, or in-situ foaming agent.

In a fifth embodiment of the first aspect of the present invention, there is provided a backfill wherein the thermally conductive particles are selected from one or more of flake graphite, carbon black, carbon fiber, carbon nanotubes, graphene, metal powder, alumina, magnesia oxide, or recycled tires.

In a sixth embodiment of the first aspect of the present invention, there is provided a backfill further comprising an air entraining agent selected from sodium dodecyl sulfate (SDS), sodium alpha-olefin sulfonate, sodium dodecylbenzenesulfonate (SDBS) or other anionic surface active agents, cetyltrimethylammonium bromide (CTAB), quaternary ammonium compounds or other cationic surface active agents, alkyl polyglucosides (APG) or other amphiphilic polymeric surfactants, water soluble soaps of resin acids, animal and vegetable fatty acids, or sulphonated organic compounds.

In a seventh embodiment of the first aspect of the present invention, there is provided a backfill further comprising one or more additives selected from rheology modifiers (for example, lignosulfate, naphthalene-based water reducers, polycarboxylate-based water reducers, superplasticizer, etc.) calcium formate, calcium nitrite, or sodium sulfate in an amount from 0.1-3 wt %.

In an eighth embodiment of the first aspect of the present invention, there is provided a backfill wherein having a slump flow greater than approximately 200 millimeters.

In a ninth embodiment of the first aspect of the present invention, there is provided a backfill wherein having a compressive strength in a range from 0.3-1.4 MPa.

In a tenth embodiment of the first aspect of the present invention, there is provided a backfill wherein having a thermal conductivity greater than approximately 1.1 W/mK.

A second aspect of the present invention is to provide a low strength, low density cementitious material having a 28 days compressive strength less than approximately 2.0 MPa. The material includes cement, aggregate, water, and filler and thermally conductive particles having a size range of approximately 0.01 microns to 500 microns in an amount of approximately 0.1 to 10 weight percent. The thermally conductive particles are evenly dispersed throughout the material by a density-controlling agent selected from one or more of a foaming agent, air entraining agent, or in-situ foaming agent in an amount of approximately 0.5-5 weight percent.

In a first embodiment of the second aspect of the present invention, there is provided a cementitious material wherein having a slump flow greater than approximately 200 millimeters.

In a second embodiment of the second aspect of the present invention, there is provided a cementitious material wherein having a compressive strength in a range from 0.3-1.4 MPa.

In a third embodiment of the second aspect of the present invention, there is provided a cementitious material further comprising an air entraining agent selected from sodium dodecyl sulfate (SDS), sodium alpha-olefin sulfonate, sodium dodecylbenzenesulfonate (SDBS) or other anionic surface active agents, cetyltrimethylammonium bromide (CTAB), quaternary ammonium compounds or other cationic surface active agents, alkyl polyglucosides (APG) or other amphiphilic polymeric surfactants, water soluble soaps of resin acids, animal and vegetable fatty acids, or sulphonated organic compounds.

In a fourth embodiment of the second aspect of the present invention, there is provided a cementitious material further comprising one or more additives selected from a rheology modifier (e.g., lignosulfonate, naphthalene based water reducer, polycarboxylate-based water reducer, superplasticizer), calcium formate, calcium nitrite, or sodium sulfate in an amount from 0.1-3 wt %.

BRIEF DESCRIPTION OF THE DRAWINGS

Embodiments of the present invention are described in more detail hereinafter with reference to the drawings, in which.

DEFINITIONS

Figure 1:
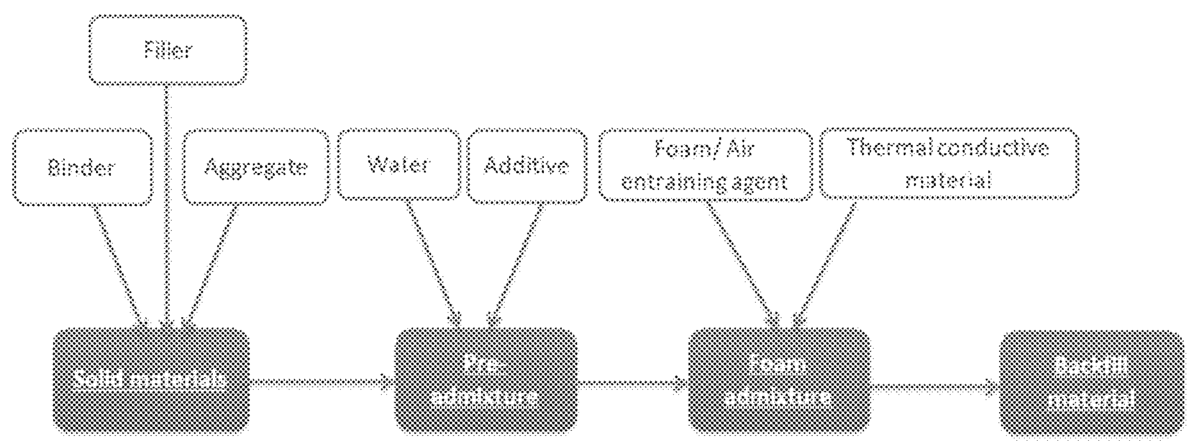
FIG. 1 illustrates the preparation process of a backfill material according to the present invention.

The term "density-controlling agent" used herein, refers to a material which exhibit the ability to adjust the amount of air/porosity of the resulting cured material. It may include foaming agents, air-entraining agents, in-situ foaming agents or other materials that are incorporated to reduce the density and strength of the cured backfill (e.g., compressive strength, tensile strength, shear strength, density).

DETAILED DESCRIPTION

The present invention provides a backfill material having improved thermal conductivity that is a mixture of binder, filler, fine aggregate, density-controlling agent such as a foaming agent and/or air entraining agent, water, optional additives and thermally conductive materials. Advantageously, a foaming agent or air-entraining agent is used to evenly disperse thermally-conductive materials throughout the backfill, enabling its use in densely-populated urban areas where there is a high concentration of underground utilities as well as a need for frequent re-excavation and re-filling of trenches containing such underground utilities.

The backfill material is carefully designed to have a very low 28 day compressive strength of less than approximately 2.0 MPa to enable re-excavation by hand. In areas with electric and optical cables, hand excavation is often required to prevent damage to expensive underground utilities. The backfill includes a cementitious binder in an amount from approximately 1 weight percent to approximately 10 weight percent. The cementitious binder is typically selected from one or more of ordinary Portland cement (OPC), calcium sulfoaluminate cement (CSA), alumina cement (AC), or alkali activated material. There is a need to balance the requirements of both low strength and rapid setting, and the amount of binder is selected with this requirement in mind. In particular, the setting strength reaches at least 0.3 MPa at 8 hours or less. This setting strength is sufficient to allow paving materials to be placed over the backfill without issues of trench subsidence.

To ensure high excavatability, fine aggregates are selected having a particle less than approximately 4.75 mm in an amount of approximately 40 to approximately 75 weight percent. These may include one or more of natural sand, manufactured sand, quartz sand, gravel, recycled glass, or recycled concrete aggregate. Additional filler may be included, having a particle size of approximately 20 microns to approximately 100 microns. This fine filler also increases the material flowability and excavatability. The fine filler may be selected from one or more of limestone, lime, fly ash, bottom ash, ground-granulated blast-furnace slag, mica, sewage sludge, or gypsum.

To further reduce the density and strength of the backfill material, a density-controlling agent in an amount of approximately 0.0001-5 weight percent may be used. The density-controlling agent creates a low-density cured material of approximately 1600 kg/$m^3$ to approximately 2000 kg/$m^3$. The density-controlling agent may be selected from one or more of a foaming agent, an air entraining agent, or an in-situ foaming agent. Importantly, the density of the backfill material is greater than the density of typical foamed concretes—this reduces the setting time to the required 8 hours or less to make the backfill material practical for use in urban areas where re-paving the surface in under one day is typically a job site requirement.

To increase the thermal conductivity of the backfill material, thermally conductive particles are evenly distributed throughout the mixture. These particles have a size range of approximately 0.01 microns to 500 microns and are present in an amount of approximately 0.1 to 10 weight percent, depending on the particular thermal conductivity requirements of the excavation site. Exemplary thermally-conductive particles include one or more of flake graphite, carbon black, carbon fiber, carbon nanotubes, graphene, metal powder, alumina, magnesia oxide, or recycled tires. In one embodiment, a foaming agent is used to ensure the even distribution of the thermally-conductive particles. While not being bound by any particular theory, it is believed that the conductive particles align at the air-water interface for even dispersion. Optionally, conductive particles may be mixed with the foaming agent. Foaming and air-entraining agents further assist with the cohesion of the backfill mixture and prevent material segregation.

Further additives may be selected to promote flowability of the mixture or further reduce the density of the cured material. These include a rheology modifier, calcium formate, calcium nitrite, or sodium sulfate in an amount from 0.1-3 wt %.

To ensure the rapid setting of the backfill material, the water content is carefully controlled. Water content is typically in a range of approximately 10% to 15 percent.

Further, the backfills of the present invention have adequate water permeability for temperate to sub-tropical climates with moderate to high rainfall amounts. Water permeability ranges from approximately $10^{-5}$-$10^{-7}$ m/s.

Table 1 lists the major components of the backfill material along with the weight percentages and exemplary materials for each of the components.

TABLE 1

| Backfill Composition | | |
|---|---|---|
| Component | Percentage | Exemplary Materials |
| Binders | 1%-10% | Cement (Ordinary Portland Cement (OPC); Calcium Sulfoaluminate cement (CSA); Alumina cement (AC), etc..); Alkali activate material. |
| Fillers (size: 20 μm-100 μm) | 10%-50% | Limestone; Lime; Fly ash; Bottom ash; Ground-granulated blast-furnace slag; Mica; Sewage sludge; Gypsum; Dolomite; Clay (Kaolin, Diatomite, Vermiculite) |
| Fine aggregate (Size less than 4.75 mm, Comply to BS EN 12620) | 40%-75% | Natural sand (River sand; Sea sand, etc.) Manufactured sand (Crush stone); Quartz sand; Gravel; Recycle glass; Recycle concrete aggregate (RCA); |
| Foaming agent | 0.5%-5% | foaming agents comprising mixtures of surfactants, nanoparticles, polymeric rheology modifying agents, humectants and nanoparticle surface modifying agents) BASF Mastercell 30; Grace Darex AE4; |
| Air entraining agent | 0.0001%-1% | Surfactant (Anionic surfactant: Sodium dodecyl sulfate (SDS); Sodium alpha-olefin Sulfonate; Sodium dodecylbenzenesulfonate (SDBS), etc..; Cationic surfactant: Cetyltrimethylammonium bromide (CTAB). Quaternary ammoniums, etc.; Non-ionic surfactant: Alkyl polyglucosides (APG), etc.) Water soluble soaps of resin acids, and animal and vegetable fatty acids; Sulphonated organic compounds; Any market available air entraining agent |
| Thermal conductive materials (size: 0.01 μm-500 μm) | 0.1-10% | Flake graphite; Carbon black; Carbon fiber; Carbon nano tube; Graphene; Metal powder (copper powder, ferrous powder); Alumina; Magnesia oxide; Recycle tires; |
| Additive | 0.1-3.0% | Rheology Modifier (e.g., lignosulfonate, naphthalene based water reducer, polycarboxylate-based water reducer, superplasticizer); Accelerator (Calcium formate, Calcium nitrite; Sodium sulfate, etc.) |

The control of the density of the material is important for ensuring the excavatability of the material, making the material suitable for excavating by hand. This density is controlled by generating air voids throughout the backfill.

Air voids may be generated by two different methods which are either foaming by foaming generator or in-situ foaming in the mix. Foam is prepared by adding a foaming generator with the resultant foam mixed into the pre-admixture until all of the foam is evenly mixed within the admixture and no foam is seen floating on the top. In-situ foaming generates air bubbles during the mixing of the dry materials and the density is controlled by the amount of a selected air-entraining agent. Table 2 summarizes the density-controlling techniques for the inventive backfill material.

An air entraining agent may be selected from one or more of sodium dodecyl sulfate (SDS), sodium alpha-olefin sulfonate, sodium dodecylbenzenesulfonate (SDBS), cetyltrimethylammonium bromide (CTAB), quaternary ammonium compounds, alkyl polyglucosides (APG), water soluble soaps of resin acids, animal and vegetable fatty acids, or sulphonated organic compounds.

Figure 2A:
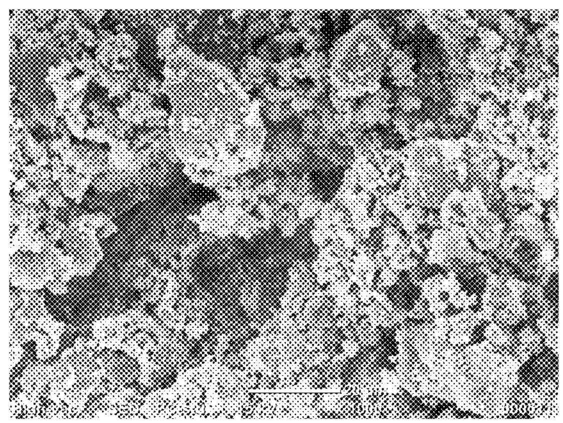
FIG. 2A depicts a prior art material with no conductive particles.
Figure 2B:
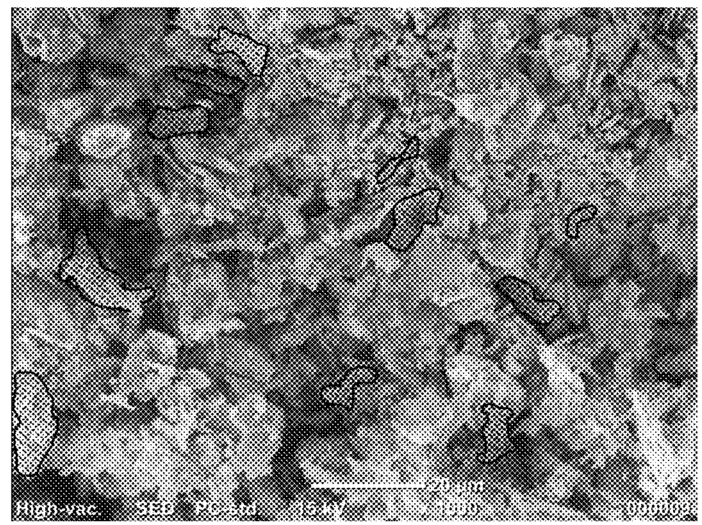
FIG. 2B depicts a material with thermally-conductive particles dispersed throughout the structure.

Foaming agents may be selected from one or more of commercially available foaming agents such as BASF Mastercell 30 Darex AE4 or other commercially-available foaming agents. Nanoparticle-stabilized foaming agents such as those disclosed in U.S. Published Patent Application No. US2017/0321026 to Sun et al., the disclosure of which is incorporated by reference herein. FIG. 2A and FIG. 2B are SEM micrographs depicting the structure of the materials of the present invention, without conductive particles (FIG. 2A) and with 4% conductive graphite particles having a size of 10-20 microns (outlined, dotted gray flakes highlighted in the matrix) (FIG. 2B). As seen in FIG. 2B, the techniques of the present invention result in a uniform distribution of conductive particles throughout the material.

TABLE 2

Density-Control for Backfill Material:

| Composition | Binder | Filler | Fine aggregate | Additive | Water | Foaming agent | Air entraining agent | thermal conductive particle |
|---|---|---|---|---|---|---|---|---|
| Method 1 | 1-10% | 10-50% | 40-75% | 0.1-3% | 10-14% | 0.5-5% | NA | 0.1-10% |
| Method 2 | | | | | | NA | 0.0001-1% | |

type and quantity of cementitious materials is at upmost importance. The amount of pozzolanic material in the formulation is regulated in order to achieve the 28 days compressive strength of 1.3 MPa or less in order to maintain the excavatability after completed filling operation in the field conditions.

The ability of the fill material to support the weight of a person and gain sufficient strength to allow the pavement or carriage way materials to be installed is another key aspect, which needs to be competitive against conventional fill materials. This can be expressed with hardening time, where the flowable fill goes from the plastic state to a hardened state. This time is greatly influenced by the amount and rate of bleed water released. When this excess water leaves the mixture, solid particles realign into intimate contact and the mixture becomes rigid. Equally, the hardening time is greatly dependent on the type and quantity of cementitious material in the flowable fill. The main constituents affecting the hardening time are: type and quantity of cementitious material, permeability and degree of saturation of surrounding soil, and water content in the fill. As the content of the cementitious material is limited due to relatively low compressive strength, the backfill achieves a 0.3 MPa compressive strength within 8 hours or less in part by controlling the water content in the slurry. In order to maintain the strength and flowability performance of the self-compacting backfill material, the fast setting attribute may be assisted through the addition of setting accelerators such as TEA (triethanolamine), which enhances the dissolution of cement particles. Additionally, finely ground seed particles may optionally be added to the mixture. Seed particles initiate the hydration of cement particles and therefore facilitate the crystallization of $Ca(OH)_2$. In macro scoping scale the combined effect of the accelerators and seed particles aid in faster solidification of the slurry, yet keeping the relatively low 28 days compressive strength as the total pozzolanic content in the mixture remains the same.

Testing the Workability of the Formulation

The on-site workability and self-levelling performance of the backfill material is expressed with the flowability. The flowability of the material is measure according to the standard concrete slump cone test (ASTM D6103, the disclosure of which standard is incorporated by reference herein). The flowability ranges can be expressed as follows: low flowability: less than 150 mm; normal flowability: 150 to 200 mm; and high flowability: greater than 200 mm. All of the backfill materials of the present invention exhibit high flowability, with the slump cone of greater than 200 mm.

With proper mixture proportioning and materials, a high degree of flowability can be attained without segregation. For example, the fine fillers may be used to provide greater cohesiveness to the wet mixture. Materials such as fly ash, hydrophobic silica fume and sewage sludge ash improve the fluidity and cohesiveness of a backfill slurry.

Testing of Mechanical Properties

The compressive strength of the material after initial setting (8 h) shall be done according to ASTM D1633, where molded samples are applied due to relative low strength. The final 28 days compressive strength is measured according to ASTM C495 method. The disclosure of these two standards is incorporated by reference herein.

Mechanical properties of flowable fills are related to the strength, excavatability, density. Unconfined compressive strength is a measure of the load-carrying ability of the flowable fill. A compressive strength of 0.3 to 0.7 MPa is comparable to an allowable bearing capacity of a well-compacted soil. The strength limits for excavatability can vary, depending on the size of the aggregates in the mixture. Mixtures using high quantities of coarse aggregate can be difficult to remove by hand, even at low strengths and thus are not employed in the present invention. Mixtures using fine sand or only fly ash as the aggregate filler have been excavated with a backhoe up to strengths of 2.1 MPa. When the re-excavatability of the flowable fills is of concern, the Testing of Thermal Properties The thermal conductivity of the developed material is tested in a simulated power cable setup, where the backfilling material is applied to cover conductive conduits in a 1.5 m×1.9 m×0.35 m size filling area. The thermal conductivity is measured according to ASTM D5334 standard. According to the ASTM standard a probe system is used, which enables the measurements from different depths and locations of the large sample so that the changes in the thermal conductivity can be monitored over time.

In another aspect, the material of the present invention may have additional applications as low-density construction materials. For this application, a dry-mix product may be supplied that permits mixing at a job site and does not require addition of a foaming agent. A dry-mix product will include an air-entraining agent to ensure that a low-density yet good thermal conductivity product is formed. An accelerating agent may be added to the dry-mix product to speed up the setting time of the material. This accelerating agent may be selected from either or both of inorganic or organic accelerating agents. Examples of inorganic accelerating agents include: metal chlorides such as calcium chloride, potassium chloride, or aluminum chloride; metal sulfates such as sodium sulfate, potassium sulfate, or calcium sulfate; metal silicates such as sodium silicate or potassium silicate; metal nitrates such as lithium nitrate or calcium nitrate; metal carbonates such as lithium carbonate or sodium carbonate. Examples of organic accelerating agents include organic acid salts such as soluble organic metal compound of the form Me $(RCOO)_2$ where R is H, and include an alkyl of 1 to 6 carbon atoms such as calcium formate, sodium acetate, sodium propanoate, calcium oxalate; amine-based accelerating agents such as triethanolamine, triisopropanolamine, or methyl diethanolamine. The conductive particles are included in the dry-mix formulation to ensure uniform dispersion in the final product.

Example 1

Preparation of Backfill Material

Preparation of backfill material was prepared as described in FIG. 1. Solid materials including binder, fillers and fine aggregate were mixed uniformly in the mixer until no visible separation of material can be seen. Pre-mix dry material was mixed with a predetermined amount of additive and water afterward.

TABLE 3

An exemplary backfill material formulation and properties

| OPC/% | LS/% | SF/% | SP/% | Water/% | Foaming agent/% |
|---|---|---|---|---|---|
| 2 | 33 | 65 | 0.30 | 13.14 | 0.5 |

| | Mechanical property | | Thermal performance | |
|---|---|---|---|---|
| Workability After 1 hr mixing/mm | 28 day compressive strength/(MPa) | Density/ $(kg \cdot m^{-3})$ | Thermal conductivity/ (W/mK) | Moisture content/wt % |
| 285 | 0.40 | 1750 | 1.409 ± 0.349 | 9.9 |

The formulation comprises a mixture of 2% by weight of Ordinary Portland cement, 33% of limestone, 65% of crushed stone, 0.30% of superplasticizer, 13.14% of water and 0.5% of foaming agent. A very low strength/highly excavatable material is obtained, having only 0.40 MPa compressive strength after 28 days with a low density of 1750 $kg/m^3$.

Example 2

The material of example 2 was prepared from a dry mix that included all of the ingredients of Table 4. Solid materials including binder, fillers, and fine aggregate were mixed uniformly in a mixer followed by adding flake graphite powder. The flake graphite was dispersed evenly in the matrix to improve thermal conductivity. The air-entraining agent ensures that a low density product is formed. The air entraining agent is PC-300, commercially available from KDFN company.

TABLE 4

Dry-Mix Composition

| OPC/% | Limestone/% | Stonefine/% | SP/% | Water/% | Air entraining agent/% |
|---|---|---|---|---|---|
| 2 | 33 | 65 | 0.15 | 13.12 | 0.0015 |

| | Mechanical property | | Thermal performance | |
|---|---|---|---|---|
| Workability After 1 hr mixing/mm | 28 day compressive strength/(MPa) | Density/ $(kg \cdot m^{-3})$ | Thermal conductivity/ (W/mK) | Moisture content/wt % |
| 285 | 0.36 | 1720 | 1.694 | 14.35 |

Example 3 (Comparative Example)

Example 3 depicts the lower thermal conductivity of the formed material when no conductive particles are included.

TABLE 5

| OPC/% | Limestone/% | Stonefine/% | SP/% | Water/% | Air entraining agent/% | Graphite/% |
|---|---|---|---|---|---|---|
| 1.5 | 33.7 | 64.8 | 0.07 | 16.10 | 0.0030 | 0 |

| | Mechanical property | | Thermal performance | |
|---|---|---|---|---|
| Workability After 1 hr mixing/mm | 28 day compressive strength/(MPa) | Density/ $(kg \cdot m^{-3})$ | Thermal conductivity/ (W/mK) | Moisture content/wt % |
| 310 | 0.27 | 1763 | 1.425 | 7.5 |

Example 4

TABLE 6

| OPC/% | Limestone/% | Stonefine/% | SP/% | Water/% | Air entraining agent/% | Graphite/% |
|---|---|---|---|---|---|---|
| 2 | 33 | 65 | 0.15 | 13.12 | 0.0025 | 1.0 |

| | Mechanical property | | Thermal performance | |
|---|---|---|---|---|
| Workability After 1 hr mixing/ mm | 28 day compressive strength/ (MPa) | Density/ (kg · m$^{-3}$) | Thermal conductivity/ (W/mK) | Moisture content/wt % |
| 215 | 035 | 1750 | 1.225 | 3.9 |

Example 5

TABLE 7

| OPC/% | Limestone/% | Stonefine/% | SP/% | Water/% | Air entraining agent/% | Graphite/% |
|---|---|---|---|---|---|---|
| 2 | 33 | 65 | 0.35 | 13.12 | 0.0030 | 4.0 |

| | Mechanical property | | Thermal performance | |
|---|---|---|---|---|
| Workability After 1 hr mixing/ mm | 28 day compressive strength/ (MPa) | Density/ (kg · m$^{-3}$) | Thermal conductivity/ (W/mK) | Moisture content/wt % |
| 230 | 0.69 | 1749 | 1.248 | 2.01 |

Figure 3:
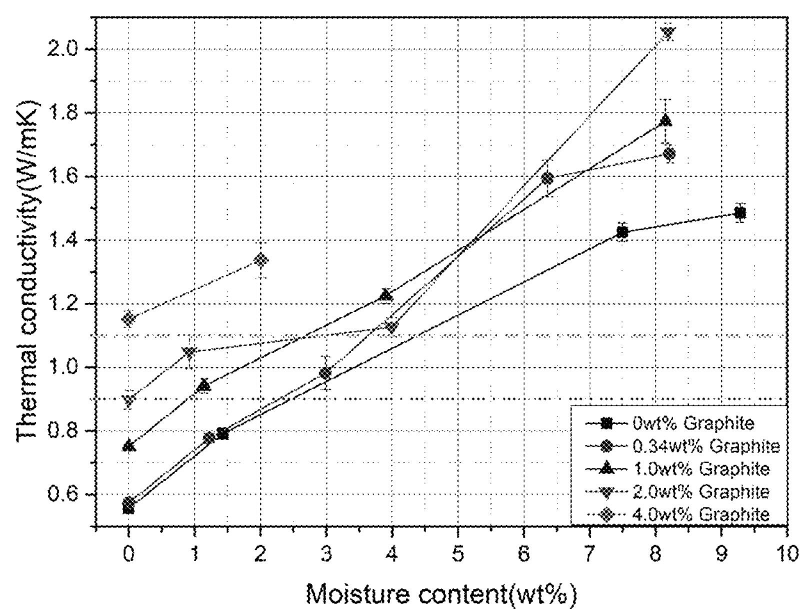
FIG. 3 depicts the thermal conductivity vs. moisture content for various compositions.

FIG. 3 depicts the thermal conductivity as a function of water content for different levels of conductive particles. As seen in FIG. 3, the conductivity increases with increasing water content and also with increasing conductive particle content.

Example 6

Note that in the above examples, due to different water content levels, the effect of the conductive particles is not clearly depicted. Therefore, the below example shows the comparative effects of the different levels of conductive particles with zero water content so that a direct comparison may be made. As seen in the table below, the conductivity increases with the amount of conductive particles.

Solid materials including binder, fillers and fine aggregate were mixed uniformly in the mixer together with air entraining agent until no visible separation of material can be seen. Pre-mix dry material was mixed with a predetermined amount of additive and water afterward.

With the increase amount of graphite in the mix formula (from 0 wt % to 4 wt %), thermal conductivity improves from 0.557 W/mK to 1.15 W/mK in the totally dry state.

TABLE 8

| OPC/ % | Lime-stone/ % | Stone-fine/% | Water/ % | SP/% | AOS/ % | G,/% | Work-ability/ mm | 28 d compressive strength/ MPa | Dry density/ (kg · m$^{-3}$) | Thermal conductivity/ (W/mK) | Moisture content/ wt % |
|---|---|---|---|---|---|---|---|---|---|---|---|
| 2 | 33 | 65 | 13.22 | 0.09 | 0.0025 | 0 | 270 | 0.53 | 1770 | 0.557 | 0 |
| 2 | 33 | 65 | 13.22 | 0.10 | 0.0025 | 1 | 215 | 0.75 | 1760 | 0.751 | 0 |
| 2 | 33 | 65 | 14.01 | 0.17 | 0.0025 | 2 | 225 | 0.72 | 1752 | 0.901 | 0 |
| 2 | 33 | 65 | 15.03 | 0.34 | 0.0025 | 4 | 230 | 0.69 | 1749 | 1.151 | 0 |

AOS: Sodium alpha-olefin Sulfonate used as in-situ air entraining agent. To achieve a density lower than 1000 kg/m$^3$, a foaming agent is used to lower the density. The thermal conductivity particles are dispersed in the foaming agent and added together with the foam in the pre-mix slurry.

Another composition is depicted below:

| OPC/% | Limestone/% | Stonefine/% | Foaming agent/% | Graphite/% |
|---|---|---|---|---|
| 10 | 50 | 40 | 5 | 1 |

Thus, the backfill compositions and related methods of preparing backfill compositions have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A low strength backfill having a 28 day compressive strength less than approximately 2.0 MPa, the backfill comprising:

a cementitious binder in an amount from approximately 1 weight percent to approximately 10 weight percent;

fine aggregates having a particle less than approximately 4.75 mm in an amount of approximately 40 to approximately 75 weight percent;

filler, having a particle size of approximately 20 microns to approximately 100 microns;

a density-controlling agent in an amount of approximately 0.0001-5 weight percent, such that the density of a cured controlled low strength backfill material is between approximately 1600 $kg/m^3$ and 2000 $kg/m^3$; and thermally conductive particles having a size range of approximately 0.01 microns to 500 microns in an amount of approximately 0.1 to 10 weight percent such that a cured backfill has a thermal conductivity equal to or greater than approximately 1.1 W/mK;

wherein a setting time of the low strength backfill material, in which a set strength backfill reaches at least approximately 0.3 MPa, is 8 hours or less.

2. The backfill of claim 1, wherein the cementitious binder is one or more of ordinary Portland cement (OPC), calcium sulfoaluminate cement (CSA), alumina cement (AC), or alkali activated material.

3. The backfill of claim 1, wherein the fine aggregates are selected from one or more of natural sand, manufactured sand, quartz sand, gravel, recycled glass, or recycled concrete aggregate.

4. The backfill of claim 1, wherein the filler is selected from one or more of limestone, lime, fly ash, bottom ash, ground-granulated blast-furnace slag, mica, sewage sludge, or gypsum.

5. The backfill of claim 1, wherein the density controlling agent is selected from one or more of a foaming agent, air entraining agent, or in-situ foaming agent.

6. The backfill of claim 1, wherein the thermally conductive particles are selected from one or more of flake graphite, carbon black, carbon fiber, carbon nanotubes, graphene, metal powder, alumina, magnesia oxide, or recycled tires.

7. The backfill of claim 1, further comprising an air entraining agent selected from one or more of an anionic surface active agent, a cationic surface active agent, or an amphiphilic polymeric surfactant.

8. The backfill of claim 1, further comprising an air entraining agent selected from sodium dodecyl sulfate (SDS), sodium alpha-olefin sulfonate, sodium dodecylbenzenesulfonate (SDBS), cetyltrimethylammonium bromide (CTAB), quaternary ammonium compounds, alkyl polyglucosides (APG), water soluble soaps of resin acids, animal and vegetable fatty acids, or sulphonated organic compounds.

9. The backfill of claim 1, wherein the backfill further comprises one or more additives selected from rheology modifiers and/or accelerating agents in an amount from 0.1-3 wt %.

10. The backfill of claim 1, wherein the backfill has a slump flow greater than approximately 200 millimeters.

11. The backfill of claim 1, wherein the backfill has a compressive strength in a range from 0.3-1.4 MPa.

12. The backfill of claim 9, wherein the accelerating agent includes one or more of calcium chloride, potassium chloride, aluminum chloride, sodium sulfate, potassium sulfate, calcium sulfate, sodium silicate, potassium silicate, lithium nitrate, calcium nitrate, lithium carbonate, sodium carbonate, calcium formate, sodium acetate, sodium propanoate, calcium oxalate, triethanolamine, triisopropanolamine, or methyl diethanolamine.

13. In a low strength, low density cementitious material having a 28 days compressive strength less than approximately 2.0 MPa, the material including cement, aggregate, water, and filler the improvement comprising:

thermally conductive particles having a size range of approximately 15 microns to 500 microns in an amount of approximately 0.1 to 10 weight percent, wherein the thermally conductive particles are evenly dispersed throughout the material by a density-controlling agent selected from one or more of an air entraining agent, foaming agent, or in-situ foaming agent in an amount of approximately 0.0001-5 weight percent such that the thermal conductivity of a cured material is greater than approximately 1.1 W/mK.

14. The material of claim 13, wherein the material has a slump flow greater than approximately 200 millimeters.

15. The material of claim 13, wherein the material has a compressive strength in a range from 0.3-1.4 MPa.

16. The material of claim 13, wherein said air entraining agent is selected from one or more of an anionic surface active agent, a cationic surface active agent, or an amphiphilic polymeric surfactant.

17. The material of claim 13, wherein said air entraining agent is selected from sodium dodecyl sulfate (SDS), sodium alpha-olefin sulfonate, sodium dodecylbenzenesulfonate (SDBS), cetyltrimethylammonium bromide (CTAB), quaternary ammonium compounds, alkyl polyglucosides (APG), water soluble soaps of resin acids, animal and vegetable fatty acids, or sulphonated organic compounds.

18. The material of claim 13, further comprising one or more rheology modifiers or accelerating agents in an amount from 0.1-3 wt %.

19. The material of claim 18, wherein the rheology modifiers are selected from one or more of lignosulfate, naphthalene-based water reducers, polycarboxylate-based water reducers, or superplasticizers.

20. The material of claim 13, further comprising an accelerating agent.

21. The material of claim 20, wherein the accelerating agent includes one or more of calcium chloride, potassium chloride, aluminum chloride, sodium sulfate, potassium sulfate, calcium sulfate, sodium silicate, potassium silicate, lithium nitrate, calcium nitrate, lithium carbonate, sodium carbonate, calcium formate, sodium acetate, sodium propanoate, calcium oxalate, triethanolamine, triisopropanolamine, or methyl diethanolamine.

* * * * *